(No Model.)
F. L. DYER.
PROCESS OF PURIFYING FIXED OILS, FATS, &c.
No. 594,467. Patented Nov. 30, 1897.
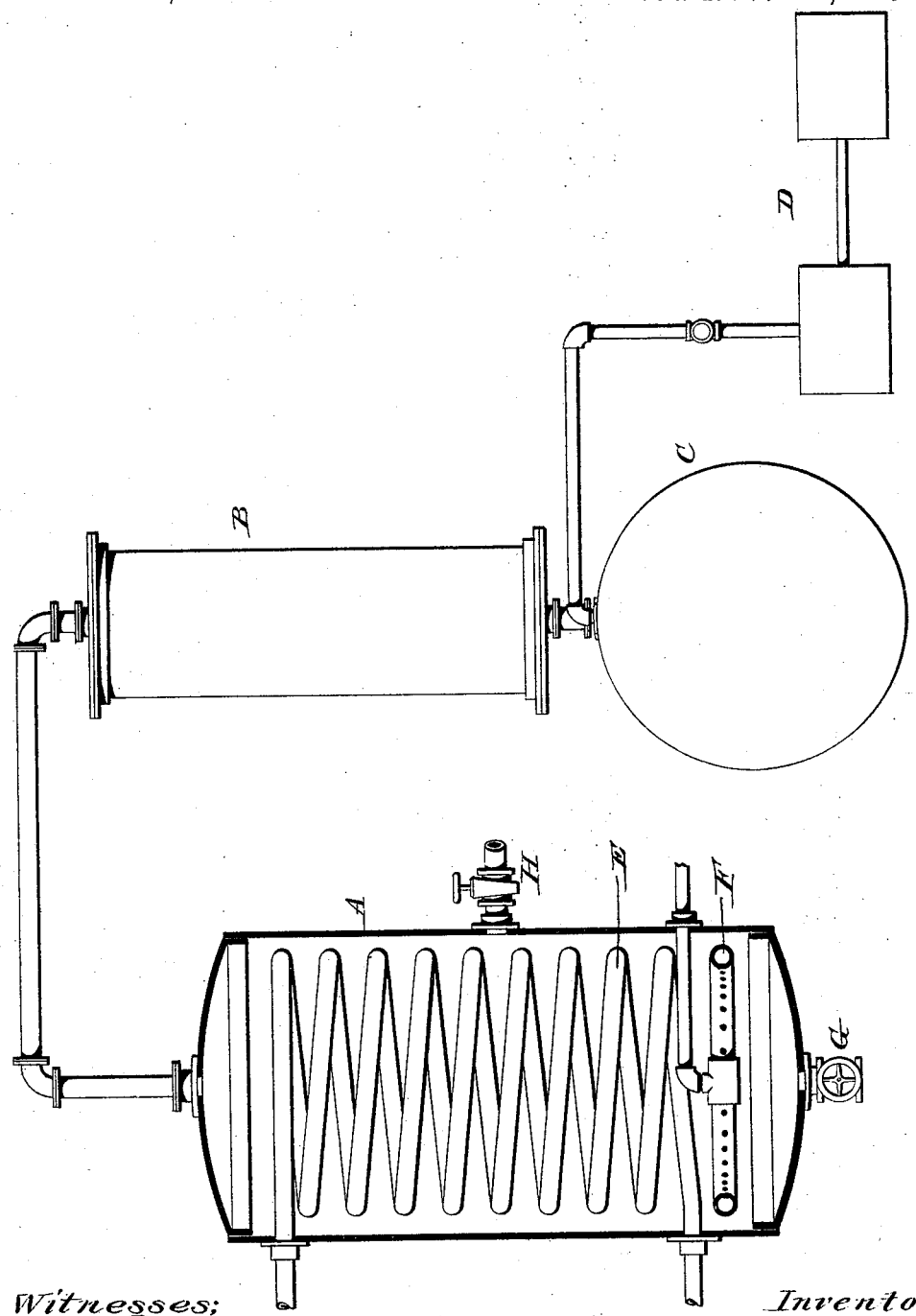
Witnesses:
Inventor
Frank L. Dyer

UNITED STATES PATENT OFFICE.

FRANK L. DYER, OF WASHINGTON, DISTRICT OF COLUMBIA, ASSIGNOR TO WILLIAM F. JOBBINS AND JOSEPH VAN RUYMBEKE, OF CHICAGO, ILLINOIS.

PROCESS OF PURIFYING FIXED OILS, FATS, &c.

SPECIFICATION forming part of Letters Patent No. 594,467, dated November 30, 1897.

Application filed March 7, 1894. Serial No. 502,691. (No specimens.)

*To all whom it may concern:*

Be it known that I, FRANK L. DYER, a citizen of the United States, residing at Washington, in the District of Columbia, have invented certain new and useful Improvements in Processes of Purification of Fixed Oils, Fats, and Fatty Acids; and I do hereby declare the following to be a full, clear, and exact description of the invention, which will enable others skilled in the art to which it appertains to make and use the same.

My invention relates to a process of distillation and purification of impure fats, such as black grease and recovered grease; and it consists in the novel treatment of the material by live steam while subjected to a high vacuum and independent heat.

In the conventional form of apparatus illustrated sectionally and diagrammatically in the accompanying drawing, A is the still; B, the condenser; C, the receiver; D, the vacuum-pump; E, the heating-coil in the still; F, the perforated delivery-pipe for the injection of the gas or vapor; G, the valved outlet-pipe for the residue in the still, and H the valved inlet-pipe for the introduction of the material into the still. I show this apparatus simply in order that my process may be understood, and therefore do not wish to be restricted or limited to the same. It is necessary, however, in order to carry my process into effect that a still should be used supplied with independent means for heating the contents thereof, which means should be adequate to compensate for most or at least a considerable portion of the heat absorbed by the expansion of the injected steam and having a delivery-pipe for the injection of the live steam therein; that a condenser should be used to condense the distillate; that a vacuum-pump or other means of producing a vacuum, such as a condensation-pipe of sufficient length to overcome atmospheric pressure, should be used to produce the necessary vacuum in the still, and that one or more receivers should be used.

In carrying out my process with an apparatus such as that illustrated for the distillation or purification and distillation of recovered grease the still is filled to about one-half of its capacity with the material. The vacuum-pump is then operated until a vacuum of from twenty-eight to thirty inches is obtained; but this is not absolutely necessary, since in the purification of the material a vacuum is not necessary. Heat is applied to the contents of the still, such as by steam in the coil E, until the material is heated to a temperature at or above the boiling-point of water at the pressure obtained, but below the temperature at which the fat distils, and steam is then injected into the liquid. The odoriferous and some other impurities therein are thus distilled off, having a lower boiling-point than the fat in the material treated, the necessary vacuum, if used, being maintained as uniform as possible. The distilled impurities pass through the condenser B and are collected and condensed in the receiver C, which operation is continued until all the impurities in the material have been removed and collected. A fresh receiver is now preferably made use of, and the temperature of the material is raised until effective distillation is obtained. This being done, the necessary high vacuum being constantly maintained, the fat distils off rapidly, and the pure distillate, passing through the condenser B, is condensed therein and collected in the receiver C. The distilled fat is separated from the condensed water by decantation in the usual way.

From this description it will be observed that the particular point of novelty in my process consists, first, in removing the impurities from the material treated by maintaining it with or without a vacuum at a temperature at or above the boiling-point of water, but below the temperature at which the material distils, and in injecting steam into the material, and, second, in maintaining the purified material thus treated at a temperature approximating the boiling-point thereof and at a high vacuum and in injecting steam into such purified liquid. By this means I am enabled to effect rapid distillation by means of steam at a low temperature and consequent low pressure, whereby the full effects of the steam are utilized very effectively and the cost of generating and handling the same is much reduced.

By heating the liquid by independent means, so as to maintain it at the boiling-point of the liquid treated, part of the heat lost by expansion of the injected steam in the presence of the vacuum is compensated for. It is of importance that the heating-coil be sufficiently capacious to supply the heat as fast as absorbed if a rapid distillation be desired. The particular advantage of this process of distillation in the treatment of fats is that by using a high vacuum I am enabled to effect rapid distillation at a correspondingly low temperature and thereby obtain a distillate light in color and of great purity.

Although I have described the above process with reference to the purification and distillation of very impure fats, such as black grease or recovered grease, I do not wish to be limited to the treatment of these bodies, as many other substances—such as stearic acid, red oil, or oleic acid and fatty acids and glycerids in general—may be subjected to the same treatment.

It is also to be understood that by this process fats and fatty acids may be distilled without being subjected to the first step of purification.

What I claim, and desire to secure by Letters Patent, is—

In the art of purifying and distilling fixed oils, fats and fatty acids, the improvement which consists in first passing steam through the material at a temperature below the boiling-point of the liquid treated, to remove volatile impurities and subsequently maintaining the material *in vacuo* in a heated state and simultaneously injecting live steam, of a temperature not lower than the boiling-point of the material at the vacuum used so that active distillation is effected, substantially as set forth.

In testimony whereof I affix my signature in presence of two witnesses.

FRANK L. DYER.

Witnesses:
A. L. SOHON,
A. G. REESE.